W. E. JERAULD.
SAFETY VALVE.
APPLICATION FILED APR. 21, 1911.
1,032,482.
Patented July 16, 1912.
2 SHEETS—SHEET 2.
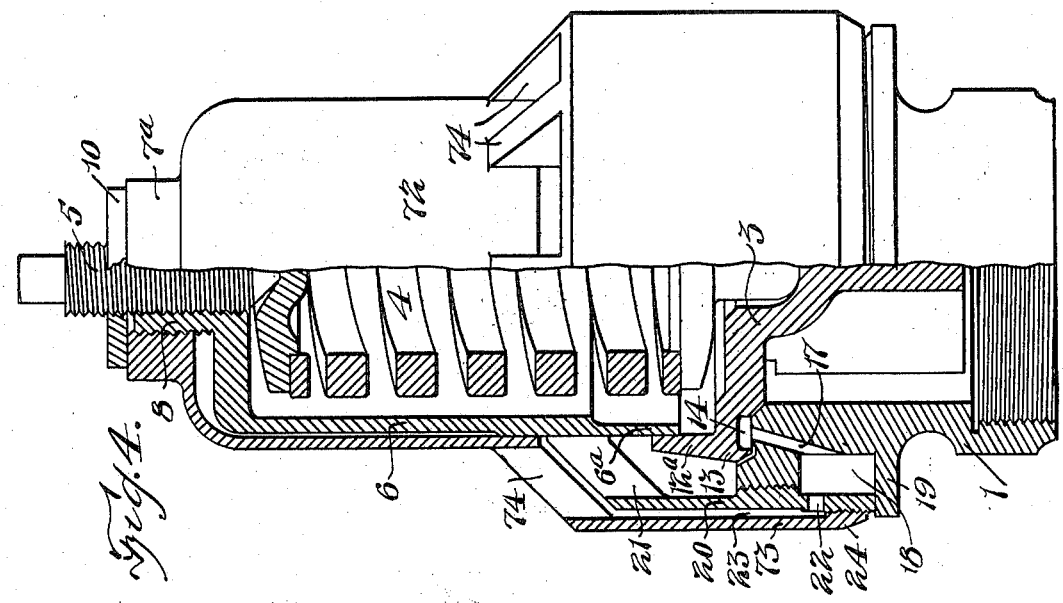
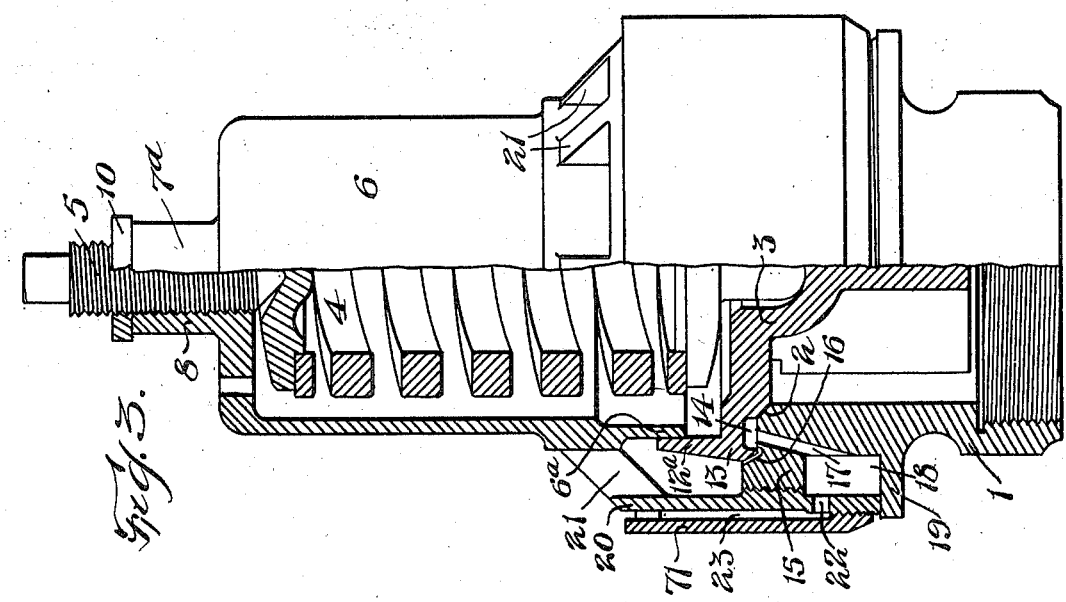
Witnesses:
Harry L. Allen
P. W. Pezzetti
Inventor:
W. E. Jerauld

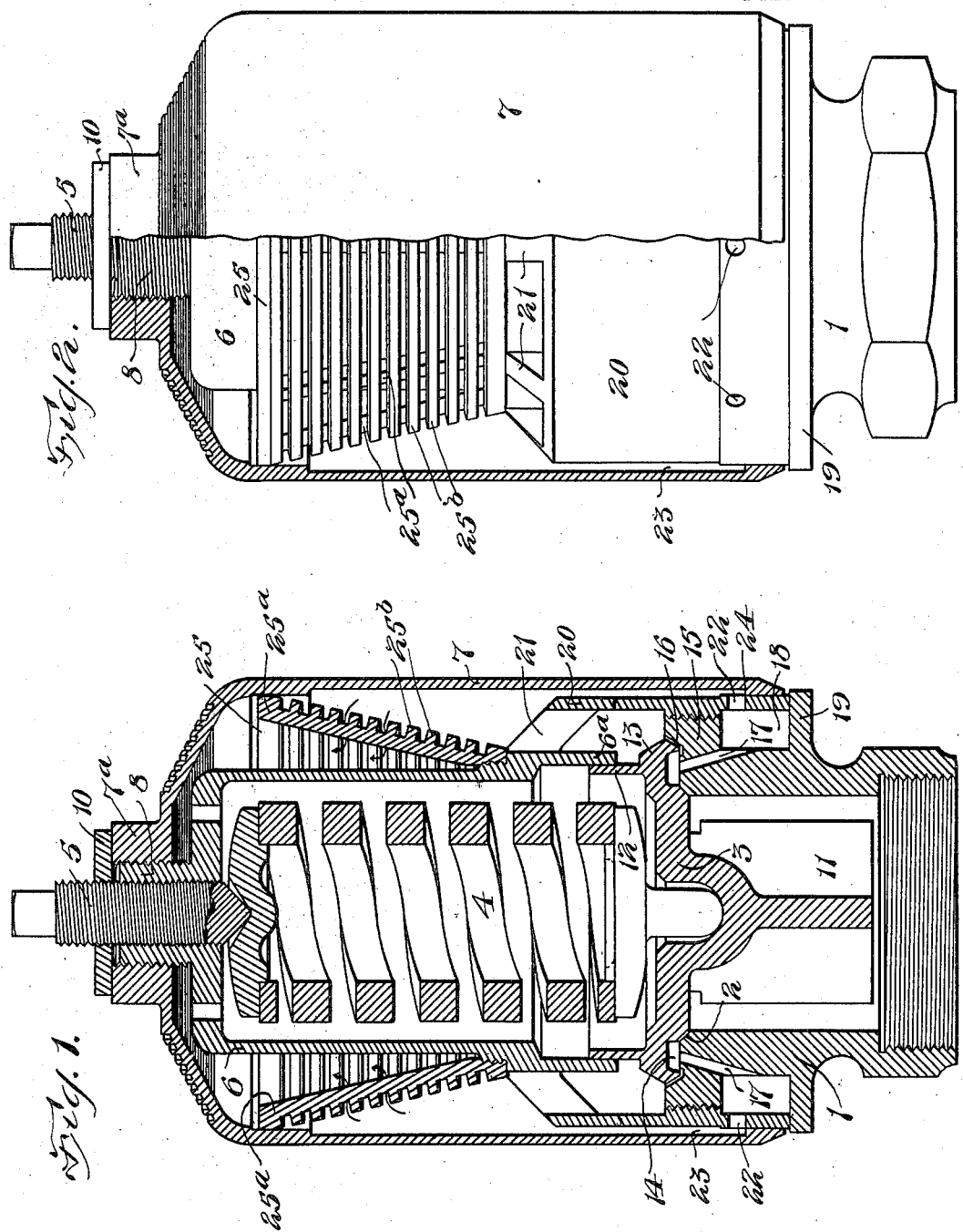

UNITED STATES PATENT OFFICE.

WILLIAM E. JERAULD, OF BOSTON, MASSACHUSETTS, ASSIGNOR TO AMERICAN STEAM GAUGE & VALVE MANUFACTURING COMPANY, OF BOSTON, MASSACHUSETTS, A CORPORATION OF NEW JERSEY.

SAFETY-VALVE.

1,032,482.  Specification of Letters Patent.  Patented July 16, 1912.

Application filed April 21, 1911. Serial No. 622,545.

*To all whom it may concern:*

Be it known that I, WILLIAM E. JERAULD, of Boston, in the county of Suffolk and State of Massachusetts, have invented certain new and useful Improvements in Safety-Valves, of which the following is a specification.

The present invention relates to safety valves of the pop type and has for its object, first, to produce a valve of this nature having capacity for a wide range of adjustment and regulation; second, to obtain a high lift for the valve without necessitating the use of a weak spring and without sacrificing steadiness of the valve; third, to make the capacity of the valve practically uniform within the usual range of blowback adjustments; fourth, to provide a single locking means for maintaining the adjustments of the spring load on the valve and of the difference in opening and closing pressures; and, finally, to simplify, strengthen and reduce the cost of production of the valve, producing a safety valve having a pop valve proper in combination with a muffler and having capability of complete and accurate regulation, with the fewest possible number of parts.

In the accompanying drawings, I have illustrated a safety valve embodying the principles of my invention in the preferred manner and form.

In these drawings,—Figure 1 is a vertical axial section of the valve. Fig. 2 is a partial external elevation of the valve and a partial elevation of the internal parts of the valve. Figs. 3 and 4 are vertical sectional views of modified forms of the valve.

The same reference characters indicate the same or similar parts in all the views.

Referring to the drawings, the numeral 1 represents a base having a threaded end adapted to be screwed upon a pipe or nipple extending from a steam boiler, and having also a valve seat 2.

3 is a valve proper having a seating face so shaped as to make an accurate fit against the valve seat 2.

4 is a spring for forcing the valve against the seat, and 5 is a screw for taking the reaction of the spring and adjusting its force, the ends of the spring being directly engaged with the usual disks formed and arranged to have a central bearing on the valve and screw respectively.

6 is an inner casing which surrounds the spring and is formed with a circular lip $6^a$ for guiding the valve.

7 is an outer casing which is threaded adjustably upon the tubular neck 8 of the inner casing 6, the adjusting screw 5 being threaded in the interior of this neck.

10 is a lock nut which is threaded loosely upon the screw 5 and engages the end of the outer casing 7 or a hub $7^a$ thereon.

The valve proper 3 is provided with wings 11 in the central passage of the base, and an annular flange 12 fitting within the lip $6^a$ of the inner casing by which it is guided and caused to seat properly. A lip 13 is formed on the periphery of the valve proper outside of the seating face in the under side of which is a groove 14 which constitutes a huddling chamber. In the top of the base is a recess which receives the lip 13, and is surrounded by a flange 15. The bottom of this recess forms the upper surface of the base adjacent to the valve seat, and the bottom of the huddling chamber. The outer boundary or wall of the recess is a conical surface 16 which is concentric with the outer face of the lip 13 but is so far outside of the latter that it is not touched thereby even when the valve is wholly closed. The outer face of the lip is beveled on an angle equal to that of the wall 16, and thus an annular space of uniform width is left between the outer face of the lip and the wall. This space is widened when the valve is opened and through it escapes so much of the steam passing the valve as does not escape through other channels presently to be described. It does not, however, open so widely or rapidly as the opening between the valve seat 2 and valve on account of the fact that it is made on a steeper or more abrupt inclination than the bevel of the valve seat. As appears from the drawing, the valve seat and the complemental face of the valve are beveled on an angle of about 45° with the horizontal, while the surface 16 and the parallel face of the lip are at an angle of about 55° with the horizontal; that is, with a plane perpendicular to the axis of the valve. In other words, the lip bevel and wall 16 make a smaller angle with the axis of the valve, or the line in which the valve proper moves in opening and closing, than does the valve seat 2. Thus the valve lip does not separate so rapidly from the surface 16 as the valve face does from the seat 2 when the valve is lifted, and consequently sufficient resistance to the escape of steam is afforded to give the valve a relatively high lift, whenever it opens. The angles which I have named are given by way of illustration and are not the only angles possible. It is possible indeed to vary the inclination of the valve seat 2 through very wide limits, even to the extent of making the seat practically flat, and the inclination of the surface 16 and lip bevel may also be varied. It is necessary, however, that the surface 16 and the parallel surface on the valve lip should be neither vertical—that is, parallel to the axis of the valve—nor on the same inclination as the valve seat, but should be between these limits, being somewhat steeper than the valve seat so that the outer escape space is less rapidly opened than the valve. The permanent opening between the valve lip and face 16 is provided to permit escape of steam from the huddling chamber when the valve is fully seated so as to allow the valve to seat firmly and quickly.

Leading through a part of the base from the huddling chamber 14 are passages 17 which open into a chamber 18 which I call the "pop chamber". This chamber is formed by an annular groove in the base between the flange 15 above noted and another flange 19, which provides the top, bottom, and inner walls, while the outer wall is formed by a sleeve 20 screwed upon the base and connected by arms 21 with the inner casing 6. In the sleeve 20 are outlets 22 through which the steam may escape, and from which it flows into an annular space 23 between the sleeve 20 and outer casing 7. On the lower end of the outer casing is a lip 24 which fits closely around the sleeve 20 just below the outlets 22 and may be raised or lowered by the screw adjustment of the outer casing previously mentioned to cover the outlets 22 wholly or in part. By means of this adjustment, the effective area of the outlets and the amount of steam which escapes through the passages 17 from the huddling chamber may be regulated. Thus the blowback of the valve, or, in other words, the fall of pressure which must occur before the valve, after being once opened, will close, is regulated. If the outlets 22 are entirely closed so that no steam can escape through the passages 17, the valve, of course, will not close until the boiler pressure has fallen to that extent that the pressure on the under side of the valve and lip is less than the pressure of the spring. On the other hand, if the outlets are opened to their full extent, the escape of steam through the passages 17 may be so rapid as to allow the valve to close again upon a very small drop in pressure. From experiments, I have found that with a boiler pressure of 150 or 200 pounds I am able to regulate the blow-back so accurately that the valve will close when the drop in pressure is less than a pound. The volume of the pop chamber 18 is greater than the combined volumes of all the passages 17 so that the steam, in issuing from these passages, is able to expand. This is a valuable feature, as it enables the flow through the passages 17 to be uniform and steady and thereby causes the valve also to be steady, preventing it from fluttering and pounding.

The ordinary range of adjustment for blowback is between two and five pounds, that is, it is very seldom that the valve is allowed to close before the pressure has dropped less than two pounds, or is held open after the pressure has dropped more than five pounds. Within these limits the capacity of the valve, by which I mean the rate of flow or discharge of steam in pounds per hour, is practically uniform. This is due to the fact that the wall or flange surrounding the valve is not changed when adjustments to vary the amount of blowback are made. In making these adjustments the wall or flange which surrounds the lip of the valve always remains in the same position, the blowback being regulated by raising or lowering of the lip 24 on the outer casing. In this respect my patent differs from the majority of adjustable safety valves wherein the blowback is regulated by raising or lowering a relief ring surrounding the lip of the valve. Thus whether the blowback is great or small (within substantially the limits above mentioned), the lift of the valve is practically uniform and the opening around the lip of the valve through which the steam may escape is practically the same under all conditions or blowback within these limits. In this respect the improved valve constitutes a great advance in the art, because it insures rapid release of pressure and allows the valve to seat quickly and tightly when the pressure has been released. This is especially important when the blowback is low, since it causes the valve to be closed tightly except when the pressure is above the point at which the valve is set to pop and thus overcomes the objectionable feature found in some valves of a continual although slight escape of steam when the pressure is kept near the pop point.

Between the inner and outer casings is a muffler 25 having certain novelties of form and construction which increase its efficiency and lower its cost. It is preferably in the form of an inverted cone consisting of parallel rings and connecting ribs. Its lower end is screw threaded and is secured to the inner casing while its upper end fits closely in the interior of the outer casing. Conveniently it is made in the first place as a conical casting formed with longitudinal internal ribs 25ª, and subsequently parallel grooves are cut in its external face to form the rings 25ᵇ which are entirely separated from each other except for their connection with the ribs 25ª. The steam, in flowing to the outlets 26 in the top of the outer casing, is obliged to pass the muffler and is obstructed by the rings 25ᵇ, whereby the noise of the escaping steam is softened.

One of the valuable features of the safety valve is its extreme simplicity and its small number of parts. It will be seen that the spring casing 6 and sleeve 20 are made in one piece, being supported by the threaded engagement of the sleeve with the flange 15 of the base, and that this one piece thus serves both as the confining case for the spring, the upper guide for the valve, and the outer wall of the pop chamber 18. The outer casing serves the combined purpose of a muffler dome and an adjuster for the relief outlets. As an adjuster, its manipulation is extremely simple, since it is mounted directly upon the top of the inner casing and need only be turned around the same to raise or lower its lip 24. Also there is nothing to prevent access to the screw 5, but the same may be readily turned to adjust the valve spring. Finally the same locking nut 10 secures the screw and casing in any adjustment.

The valve above described is of the kind known as the closed or muffled type of valve, in which the steam passes first into the space inclosed between the inner casing and the outer or muffler casing before escaping to the atmosphere. In Figs. 3 and 4 I have illustrated two forms of open valve from which the steam escapes directly into the atmosphere without passing through a muffler. Most of the principles of these other forms of valve are the same as hereinbefore described, the only exception being in the details of construction which constitute a feature of the form shown in Figs. 1 and 2. In the form of valve shown in Fig. 3 the base, inner casing, valve proper, spring, adjusting screw and sleeve 20 are practically the same as shown in Fig. 1 with slight modifications presently to be described. In particular the arrangement of the valve with its seating face and beveled lip, and the valve seat with the flange surrounding the beveled valve lip are identically the same. That is the bevel of the lip and the encircling wall are steeper than the bevel of the valve seat, while the ring surrounding the lip is not adjustable. The main difference consists in the fact that the muffler and muffler casing are eliminated, and that instead of the latter a deep ring 71 is provided for adjusting the blowback of the valve. This ring has its adjustable connection with the sleeve 20, which as previously described, is integrally united with the inner casing by arms 21, by means of intermeshing screw threads on the exterior of the sleeve and interior of the ring, below the outlets 22. The ring above its threaded connection with the sleeve is enough larger than the latter to provide an annular space 23 through which the steam may pass. The object of extending the ring above the outlets is to prevent the steam from blowing out through the outlets in all directions and changing the direction of its flow into parallelism with the axis of the valve. There is also a slight modification in the guiding engagment between the valve and the inner casing in that the flange 12 of the valve is outside instead of inside of the lip 6ª of the inner casing. The exterior of this flange also is tapered to the largest diameter of the valve lip. The object of this last described change of construction is to diminish the area of the valve upon which the back pressure of the outflowing steam can act.

In the form shown in Fig. 4 the muffler is eliminated and the outer casing changed in construction to a shell 72 closely surrounding the inner casing 6 and a shell 73 of larger diameter surrounding the sleeve 20. The shell and sleeve are connected by a few arms 74 between which are large spaces permitting free escape of all of the steam which passes the valve proper. The ring 73 is the same in form as the lower part of the muffler casing 7 shown in Fig. 1, and has a lip 24 surrounding the base of the sleeve 20 and regulating the outlets 22. The shell 72 has a bearing at 75 on the inner casing and is adjustably screw threaded on the neck 8 thereof. In this form also the valve proper is the same as in Fig. 3 and is therefore the same in principle as that shown in Fig. 1. The only material difference between Figs. 1 and 4 is that the valve shown in Fig. 1 is a muffled valve and that shown in Fig. 4 is an open valve. The relative arrangement of the lip 6ª and valve flange may be the same in all the forms as shown in Figs. 3 and 4, or as shown in Fig. 1.

I claim:—

1. In a safety valve, the combination with a base having a passage and a valve seat, a valve proper coöperating with said seat and having a peripheral lip recessed to form a huddling chamber outside of the valve seat, provisions for conducting steam from the huddling chamber, said provisions including an external orifice, and external means movable transversely of said orifice for wholly or partially closing the latter to an exactly regulated extent.

2. In a safety valve, the combination with a base having a passage and a valve seat, a valve proper having a lip inclosing a huddling chamber, said base being provided with relief outlets leading from said huddling chamber, and an adjustable sleeve surrounding the base and movable transversely of the outlets.

3. In a safety valve, a base having a steam passage, a valve seat surrounding such passage, an annular chamber, relief channels extending from points outside of the valve seat to the chamber, and external outlets from said chamber; a valve arranged to coöperate with said seat and provided with an outer lip chambered on its under side overlying said channels; and an external member having a lip closely surrounding the base adjacent to said outlets, said member being adjustable to move said lip transversely of said outlets, whereby the latter may be covered to a greater or less extent.

4. In a safety valve, the combination of a base having a seating face and a flaring or conical wall surrounding such seating face, and a valve proper formed to seat against such face and having an outer lip within said wall forming a huddling chamber, the outer face of the lip being parallel to the wall and separated therefrom and from the said base when the valve is closed, and the inclination of the wall and lip face being intermediate that of the valve seat and the axis, said base also having a pop chamber into which steam from the huddling chamber is conducted and wherein the steam may expand, said pop chamber having a restricted external outlet.

5. In a safety valve, the combination of a base having a seating face, a valve proper formed to coöperate with said face and having an external lip, the base having a conical wall surrounding said lip and making a smaller angle than the valve seat with the axis of the valve, and the face of the lip next to the wall being parallel thereto and separated therefrom at all times, and the base containing also a pop chamber having inlets leading through the base from the surface over which the valve lip extends, and having outlets of greater area than the inlets, whereby steam may expand in the pop chamber, and means for regulating the effective area of such outlets.

6. In a safety valve, a base having a steam passage, the top face of said base being also provided with a recess surrounding said passage and having an outer conical wall lying at an acute angle to the axis of the steam passage, said base being further provided with a valve seat between said conical wall and said passage, the angle of said valve seat with respect to the axis of the steam passage being greater than the angle of said conical wall, and a valve formed to coöperate with said seat and having a lip arranged to lie in said recess, said lip having an exterior wall parallel with said conical wall and separated from the base when the valve is seated.

7. A pop safety valve, comprising a base, an inner casing secured to the base, a valve proper having a lip, a spring tending to seat said valve, a screw adjustably threaded into the end of the casing for regulating the pressure of the spring, relief outlets through the base from the valve lip, an outer shell adjustably threaded on the inner casing and having a portion closely fitting the exterior of the base arranged adjacent to the outlets and adapted to vary the effective area thereof, and a lock nut threaded on the screw and engaging the outer shell, thereby to lock both the screw and the outer shell in their adjustments.

8. A safety valve, comprising a base having a passage and a valve seat, a valve proper adapted to coöperate with said seat and having an outer lip, the base having an annular chamber in its outer side and passages leading to such chamber from the space within said lip, a sleeve threaded on the base outside of the chamber, forming the outer wall thereof and having outlets, an inner casing connected to said sleeve and formed on its outer end with a hub or nipple threaded both internally and externally, a spring contained in said inner casing, a screw threaded in the hub thereof and bearing on the spring, an outer casing meshing adjustably with the external threads of said hub with its lower end closely surrounding said sleeve adjacent to the outlets, and a lock nut threaded upon the screw and engaging the outer casing.

9. In a safety valve having a base formed with a passage and a valve seat, and a valve proper adapted to coact with said seat, a means of compelling a relatively high uniform lift of the valve when it opens, consisting in providing the valve proper with a lip having its outer face beveled on a steeper slant, with respect to the direction of lift of the valve, than the valve seat, and providing the base with a wall surrounding the lip and parallel with the beveled face thereof, said lip being separated from said base when the valve is seated.

10. A safety valve including a base having a passage and a valve seat, a valve proper coöperating with said seat and adapted to open and close the passage, and provisions for regulating the blow back of the valve while maintaining its capacity uniform within ordinary working limits, comprising an inclosed chamber having an inlet extending through said base and located outside of and near the valve seat and an external outlet of greater area than the inlet, a lip on the valve overlying the said inlet, a fixed wall rising from the base closely surrounding the lip, and a regulator independent of said valve and said wall for adjusting the effective area of the pop chamber outlet.

11. A safety valve, comprising a base having a passage and a valve seat, a valve proper adapted to coöperate with said seat and having an outer lip, the base having a chamber with outlets in its outer side and inlets leading from the space within said lip, a sleeve threaded on the base, an inner casing connected to said sleeve, and an outer casing threaded on a part of said inner casing, whereby it may be adjusted axially of the valve, and having a lip closely surrounding the base adjacent to the said chamber outlets and adapted by such adjustment of the casing to close such outlets to a greater or less extent.

12. A safety valve, comprising a base having a passage and a valve seat, a valve proper adapted to coöperate with said seat and having an outer lip, the base having a chamber with outlets in its outer side and inlets leading from the space within said lip, an inner casing secured to the base, and an outer casing threaded adjustably upon a part of the inner casing and extending below said chamber outlets, whereby the discharge from the latter occurs within the outer casing said casing having a lip closely fitting the external chamber wall below the outlets and adapted by adjustment of the casing to close the said outlets to a greater or less extent.

In testimony whereof I have affixed my signature, in presence of two witnesses.

WILLIAM E. JERAULD.

Witnesses:
C. F. BROWN,
P. W. PEZZETTI.